(12) United States Patent
Spilsbury

(10) Patent No.: US 9,026,276 B2
(45) Date of Patent: May 5, 2015

(54) UNMANNED AIR VEHICLE COMMUNICATIONS

(75) Inventor: Daniel Michael Spilsbury, Preston (GB)

(73) Assignee: Bae Systems PLC, London (GB)

( * ) Notice: Subject to any disclaimer, the term of this patent is extended or adjusted under 35 U.S.C. 154(b) by 0 days.

(21) Appl. No.: 14/009,071

(22) PCT Filed: Mar. 23, 2012

(86) PCT No.: PCT/GB2012/050648
§ 371 (c)(1),
(2), (4) Date: Sep. 30, 2013

(87) PCT Pub. No.: WO2012/131336
PCT Pub. Date: Oct. 4, 2012

(65) Prior Publication Data
US 2014/0200749 A1      Jul. 17, 2014

(30) Foreign Application Priority Data

Mar. 31, 2011   (GB) .................................. 1105520.9

(51) Int. Cl.
*H04L 9/00*   (2006.01)
*H04B 7/185*   (2006.01)
*B64D 47/00*   (2006.01)
*H04W 12/02*   (2009.01)

(52) U.S. Cl.
CPC .............. *H04B 7/18506* (2013.01); *H04L 9/00* (2013.01); *H04L 2209/12* (2013.01); *H04L 2209/80* (2013.01); *H04L 2209/84* (2013.01); *B64D 47/00* (2013.01); *H04W 12/02* (2013.01)

(58) Field of Classification Search
CPC ............ B64C 2201/00; H04L 2209/84; H04L 2209/80; H04L 2209/12; H04L 9/00; B64D 47/00; H04B 7/18506
See application file for complete search history.

(56) References Cited

U.S. PATENT DOCUMENTS

| 5,995,628 | A  | * | 11/1999 | Kitaj et al. ..................... 713/164 |
| 7,310,728 | B2 | * | 12/2007 | Haight ............................ 713/154 |
| 7,873,444 | B1 |   | 1/2011  | Ehrmantraut et al. |
| 8,219,799 | B1 | * | 7/2012  | Lucchesi et al. .............. 713/153 |

(Continued)

FOREIGN PATENT DOCUMENTS

| EP | 1 187 356 A2 | 3/2002 |
| EP | 1 953 954 A2 | 8/2008 |
| EP | 2 063 550 A2 | 5/2009 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Oct. 10, 2013, in the corresponding International Application No. PCT/GB2012/050648. (7 pages).

(Continued)

*Primary Examiner* — Michael J Zanelli
(74) *Attorney, Agent, or Firm* — Maine Cernota & Rardin

(57) ABSTRACT

A communications management system, including a configurable router, and method, for an unmanned air vehicle (UAV), arranged to selectively route data between a plurality of avionic subsystems/communications resources on the UAV and a plurality of transceivers on the UAV, the routes selected being determined at least in part according to a desired red and black data separation of data to be transmitted from the transceivers and/or a red and black data separation of data being received by the transceivers.

14 Claims, 2 Drawing Sheets

(56) References Cited

U.S. PATENT DOCUMENTS

| | | |
|---|---|---|
| 2002/0164030 A1 | 11/2002 | Stephenson et al. |
| 2003/0194996 A1 | 10/2003 | Campbell |
| 2006/0059537 A1 | 3/2006 | Alvermann et al. |
| 2006/0252382 A1 | 11/2006 | Campbell |
| 2008/0181394 A1 | 7/2008 | Keefe et al. |
| 2009/0133112 A1 | 5/2009 | Kauffman et al. |
| 2011/0035149 A1 | 2/2011 | McAndrew et al. |

OTHER PUBLICATIONS

International Search Report (PCT/ISA/210) mailed on Jul. 26, 2012, by the European Patent Office as the International Searching Authority for International Application No. PCT/GB2012/050648.

United Kingdom Search Report for GB 1105520.9 dated Aug. 4, 2011.

Constantinides, Chris et al., "Security Challenges in UAV Development", IEEE, 2008, 8 pages.

* cited by examiner

UNMANNED AIR VEHICLE COMMUNICATIONS

FIELD OF THE INVENTION

The present invention relates to unmanned air vehicle (UAV) communications, i.e. communications between a UAV and one or more further entities, including, but not limited to, communications between a UAV control station and a UAV. The present invention also relates to communication and processing of data within a UAV and/or within a further entity, when that data has been, or results from data that has been, communicated between the UAV and the further entity. The present invention also relates to communication and processing of data within a UAV and/or within a further entity, when that data is provided for or is intended for communicating between the UAV and the further entity.

BACKGROUND

Many types of manned aircraft, in particular manned military aircraft, have a communications management capability where some of the following functionality is provided on the aircraft):
 (i) separating "unencrypted protectively marked data" (known as, and herein referred to as, "red data") and "encrypted protectively marked data and/or not-protectively marked data" (known as, and herein referred to as, "black data");
 (ii) being able to use a "red" system to command "black" communications equipment;
 (iii) providing a level of autonomy in communications management; and
 (iv) providing the ability to configure communication pathways through the system in order that the specific route that data (i.e. datagrams) take from source to destination is pre-defined.

Conventionally, UAVs are not provided with secure communications management capability.

SUMMARY OF THE INVENTION

The present inventors have realised that it is not possible/practicable to provide a communications management capability for a UAV by simply providing, and splitting into two parts (air and ground), arrangements known from manned aircraft, especially in examples where the functionality listed above as (i) to (iv) is desired for the communications capability.

The present inventors have further realised that it would be desirable to provide additional flexibility in a UAV communications management capability compared to the level of flexibility provided by known on-board communications management capabilities of manned aircraft. The present inventors have arrived at this realisation at least in part by realising that for a UAV it would be advantageous to compensate for the lack of a human on-board operator and the trusted flexibility he provides in a manned aircraft.

The present inventors have further realised it would be desirable to support data at a plurality of levels of protective marking, and have realised in relation to this that it would be desirable to provide implementations of UAV communications management capability that efficiently implement, and/or have synergy with, such an aspect of operation.

The present inventors have further realised that it would be desirable to provide the ability to mitigate line of sight voice "step-on" resulting from beyond line of sight latency. This is where voice transmissions made from the UAV are made at the same time as other local users because it is historically difficult to establish whether the channel is free of other transmissions before being made.

In a first aspect, the present invention provides a communications management system for an unmanned air vehicle; wherein the communications management system is adapted for use on an unmanned air vehicle, and is arranged to selectively route data between a plurality of avionic subsystems/communications resources on the unmanned air vehicle and a plurality of transceivers on the unmanned air vehicle, the routes selected being determined at least in part according to a desired red and black data separation of data to be transmitted from the transceivers and/or a red and black data separation of data being received by the transceivers.

The communications management system may comprise a configurable router for use on the unmanned air vehicle, the router arranged to route data between the plurality of avionic subsystems/communications resources on the unmanned air vehicle and the plurality of transceivers on the unmanned air vehicle.

The communications management system may further comprise a controller for the configurable router, the controller being adapted for use on the unmanned air vehicle.

It may be that, for at least one of the transceivers on the unmanned air vehicle, the communications management system further comprises at least one black link for linking the router to the transceiver.

It may be that, for a plurality of the transceivers on the unmanned air vehicle, the communications management system further comprises at least one respective black link for linking the router to the respective transceiver.

It may be that, for at least one of the transceivers, the communications management system further comprises at least one red link for linking the router to the transceiver.

The communications management system may further comprise separate red links and/or black links between the router and the respective avionic subsystem/communications resource of the plurality of avionic subsystems/communications resources.

The communications management system may further comprise a respective gateway guardian at an interface between the router and at least one of the following: the black router-transceiver link(s), the red router-transceiver link(s), and the router-avionic subsystem/communications resource link(s).

The communications management system may be further arranged to selectively buffer data that has been received with a delay if in consequence of the delay an intended recipient avionic subsystem/communications resource of the unmanned air vehicle is not in a desired operating condition.

In a further aspect, the present invention provides a communications management system for managing communication between an unmanned air vehicle and a separate entity, comprising: a communications management system for the unmanned air vehicle according to any of the above aspects; and a communications management system for the separate entity; the communications management system for the separate entity being arranged to selectively route data between a plurality of avionic subsystems/communications resources of the separate entity and a plurality of transceivers of the separate entity, the routes selected being determined at least in part according to a desired red and black data separation of data to be transmitted from the transceivers of the separate entity and/or a red and black data separation of data being received by the transceivers of the separate entity.

It may be that the communications management system according to the aspect stated in the preceding paragraph comprises one or more features corresponding to the additional features recited for the communications management system for the unmanned air vehicle according to any of the aspects thereof stated above.

In a further aspect, the invention provides an unmanned air vehicle, comprising: a communications management system for a UAV according to any of the aspects thereof stated above; a plurality of transceivers; and a plurality of avionic subsystems/communications resources.

In a further aspect, the present invention provides a method of managing communications on an unmanned air vehicle, the method comprising selectively routing data between a plurality of avionic subsystems/communications resources on the unmanned air vehicle and a plurality of transceivers on the unmanned air vehicle, the routes selected being determined at least in part according to a desired red and black data separation of data to be transmitted from the transceivers and/or a red and black data separation of data being received by the transceivers.

In a further aspect, the present invention provides a program or plurality of programs arranged such that when executed by a computer system or one or more processors it/they cause the computer system or the one or more processors to operate in accordance with the method stated above.

In a further aspect, the present invention provides a machine readable storage medium storing a program or at least one of the plurality of programs according to the aspect stated above.

DETAILED DESCRIPTION

Figure 1:
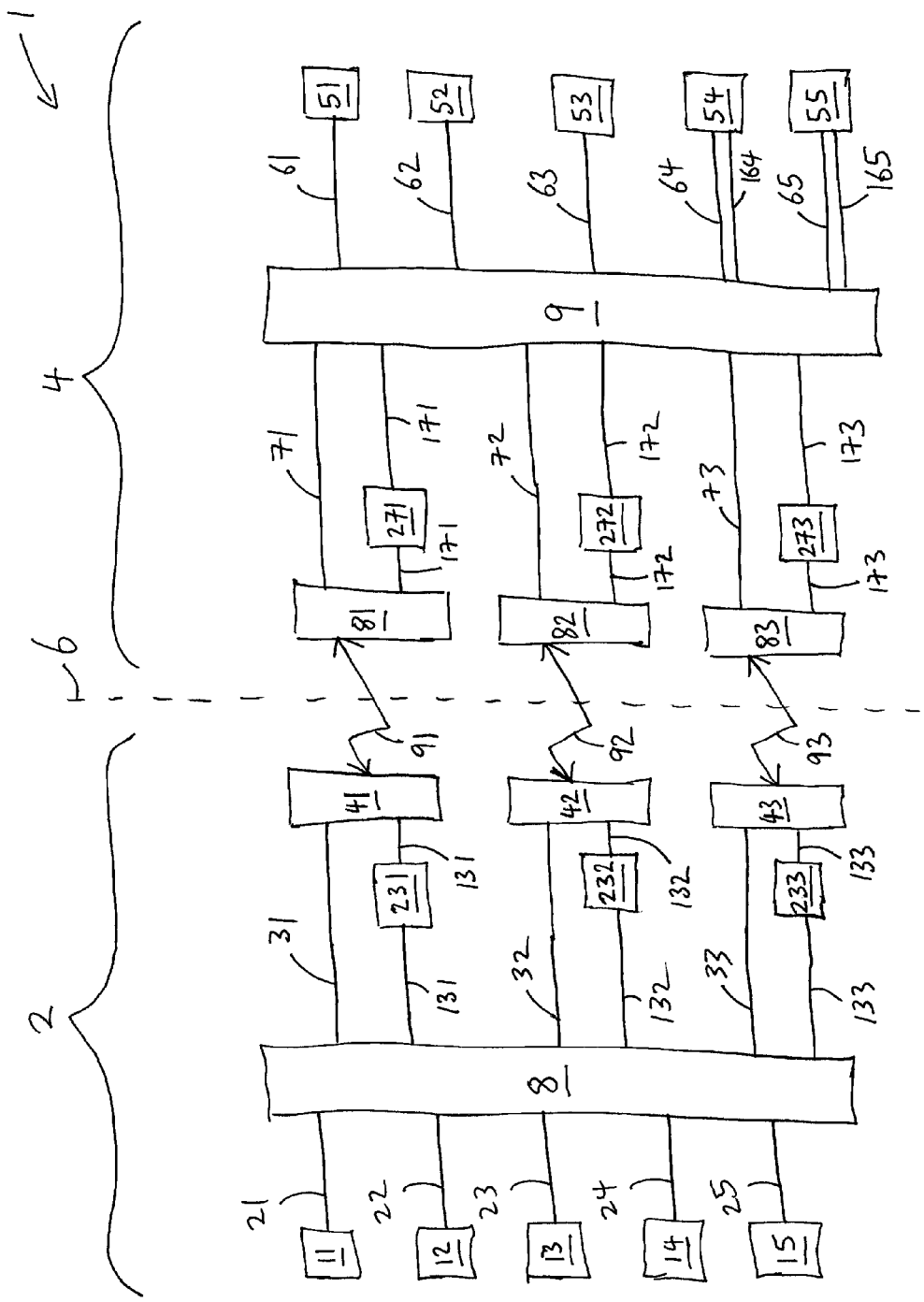
FIG. 1 is a schematic block diagram of a first embodiment of a communications management system for a UAV.

FIG. 1 is a schematic block diagram of a first embodiment of a communications management system 1 for a UAV.

In this embodiment, the communications management system 1 is for communication between "ground" (in this example a UAV control station) and "air" (in this example a UAV being primarily controlled by the UAV control station). Accordingly the communications management system 1 comprises a ground-based system 2 (located in this example in the UAV control station) and an air-based system 4 located in the UAV. The ground-based system 2 and the air-based system 4 are arranged to communicate between each other over a ground-air interface 6, as will be described in more detail below.

The ground-based system 2 comprises a ground communications management system (ground CMS) 8. The air-based system 4 comprises a corresponding air communications management system (air CMS) 9.

The ground-based system 2 further comprises a plurality of elements that may be viewed as ground avionics subsystems and/or communications resources, each of which is hereafter referred to as a ground avionics subsystem/communications resource (ground AS/CR). In this embodiment the ground-based system 2 comprises a first ground AS/CR 11 which is a ground mission system 11, a second ground AS/CR 12 which is a ground flight control system 12, a third ground AS/CR 13 which is a ground controller for the ground CMS 8 (i.e. the third ground AS/CR 13 is a ground CMS controller 13), a fourth ground AS/CR 14 which is in effect a ground voice radio channel resource operating at a given level of protective marking requirement (or no such requirement), and a fifth ground AS/CR 15 which is in effect a ground voice radio channel resource operating at a given level of protective marking requirement (or no such requirement) that is, in this embodiment, different to that of the fourth ground AS/CR 14.

The ground AS/CRs 11-15 are respectively coupled to the ground CMS 8 by respective links, namely a first ground AS/CR-CMS link 21, a second ground AS/CR-CMS link 22, a third ground AS/CR-CMS link 23, a fourth ground AS/CR-CMS link 24, and a fifth ground AS/CR-CMS link 25.

In this embodiment, the ground-based system 2 further comprises three wireless transceivers, namely a first ground wireless transceiver 41, a second ground wireless transceiver 42, and a third ground wireless transceiver 43.

In this embodiment, the ground wireless transceivers 41-43 are respectively coupled to the ground CMS 8 by respective pairs of links, where each pair of links comprises a red link (i.e. no encryption) and a black link (i.e. encryption). Each black link comprises a respective encryption and decryption module. More particularly, in this embodiment, the first ground wireless transceiver 41 is coupled to the ground CMS 8 by a first ground CMS-transceiver red link 31 and by a first ground CMS-transceiver black link 131, with the first ground CMS-transceiver black link 131 comprising a first ground encryption and decryption module 231; the second ground wireless transceiver 42 is coupled to the ground CMS 8 by a second ground CMS-transceiver red link 32 and by a second ground CMS-transceiver black link 132, with the second ground CMS-transceiver black link 132 comprising a second ground encryption and decryption module 232; and the third ground wireless transceiver 43 is coupled to the ground CMS 8 by a third ground CMS-transceiver red link 33 and by a third ground CMS-transceiver black link 133, with the third ground CMS-transceiver black link 133 comprising a third ground encryption and decryption module 233.

The air-based system 4 further comprises a plurality of elements that may be viewed as air avionics subsystems and/or communications resources, each of which is hereafter referred to as air avionics subsystem/communications resource (air AS/CR). In this embodiment the air-based system 4 comprises a first air AS/CR 51 which is an air mission system 51, a second air AS/CR 52 which is an air flight control system 52, a third air AS/CR 53 which is an air controller for the air CMS 9 (i.e. the third air AS/CR 53 is an air CMS controller 53), a fourth air AS/CR 54 which is in effect an air voice radio channel resource operating at a given level of protective marking requirement (or no such requirement), and a fifth air AS/CR 55 which is in effect an air voice radio channel resource operating at a given level of protective marking requirement (or no such requirement) that is, in this embodiment, different to that of the fourth air AS/CR 54.

The air AS/CRs 51-55 are respectively coupled to the air CMS 9 by respective red links, namely a first air AS/CR-CMS red link 61, a second air AS/CR-CMS red link 62, a third air AS/CR-CMS red link 63, a fourth air AS/CR-CMS red link 64, and a fifth air AS/CR-CMS red link 65. The air voice radio channel resources AS/CR 54 links, namely and AS/CR 55 are also respectively coupled to the air CMS 9 by respective black a first air AS/CR-CMS black link 164, and a second air AS/CR-CMS black link 165. The black links 164 and 165 may or may not have external encryption and decryption devices in their path (not shown).

In this embodiment, the air-based system 4 further comprises three wireless transceivers, namely a first air wireless transceiver 81, a second air wireless transceiver 82, and a third air wireless transceiver 83.

In this embodiment, the air wireless transceivers 81-83 are respectively coupled to the air CMS 9 by respective pairs of links, where each pair of links comprises a red link (i.e. no encryption) and a black link (i.e. encryption). Each black link comprises a respective encryption and decryption module. More particularly, in this embodiment, the first air wireless transceiver 81 is coupled to the air CMS 9 by a first air CMS-transceiver red link 71 and by a first air CMS-transceiver black link 171, with the first air CMS-transceiver black link 171 comprising a first air encryption and decryption module 271; the second air wireless transceiver 82 is coupled to the air CMS 9 by a second air CMS-transceiver red link 72 and by a second air CMS-transceiver black link 172, with the second air CMS-transceiver black link 172 comprising a second air encryption and decryption module 272; and the third air wireless transceiver 83 is coupled to the air CMS 9 by a third air CMS-transceiver red link 73 and by a third air CMS-transceiver black link 173, with the third air CMS-transceiver black link 173 comprising a third air encryption and decryption module 273.

In this embodiment, wireless links 91-93 are provided over the ground-air interface 6 by respective pairs of the ground wireless transceivers 41-43 and the air wireless transceivers 81-83, namely a first wireless link 91 is provided by the first ground wireless transceiver 41 and the first air wireless transceiver 81, a second wireless link 92 is provided by the second ground wireless transceiver 42 and the second air wireless transceiver 82, and a third wireless link 93 is provided by the third ground wireless transceiver 43 and the third air wireless transceiver 83.

In this embodiment, the first wireless link 91 and the second wireless link 92 are "beyond line of sight" links e.g. these wireless links 91, 92 are provided via a satellite communications arrangement, and the third wireless link 93 is a "line of sight" link. (In other embodiments, other permutations may be provided, including all line of sight or all beyond line of sight.)

In this embodiment the data being routed between all the above entities is packetized digital data, more particularly internet protocol (IP) formatted data, including where appropriate voice data as Radio over IP (RoIP) and or Voice over IP (VoIP), and data including where appropriate Transport Control Protocol (TCP), User Datagram Protocol (UDP), Hypertext Transfer Protocol (HTTP), File Transfer Protocol (FTP), Network Time Protocol (NTP). However, in other embodiments, other formats and protocols may be employed in addition or instead.

In operation, the ground CMS 8 and the air CMS 9 route data (including audio data) that is being communicated between the ground-based system 2 and the air-based system 4 via the various ground and air CMS-transceiver links. For example, certain data fed to the ground CMS 8 from one of the ground AS/CRs 11-15 that is required to be transmitted over the ground-air interface 6 in encrypted form from the ground-based system 2 to the air-based system 4 may be routed by the ground CMS 8 (and other conventional routing elements such as a network switch (not shown) of the ground-based system 2) along the first black ground CMS-transceiver link 131 (where the data is encrypted by the first ground encryption and decryption module 231) to the first ground transceiver 41, where the encrypted data is transmitted over the first wireless link 91. The encrypted data is accordingly received by the first air transceiver 81 and routed (including where relevant by other conventional routing elements such as a network switch (not shown) of the air-based system 4) along the first black air CMS-transceiver link 171 (where the data is decrypted by the first air encryption and decryption module 271) to the air CMS 9 from where the data is routed to the appropriate air AS/CR 51-55. It will be appreciated that a corresponding example, for data being transmitted in the reverse direction, i.e. from the air-based system 4 to the ground-based system 2, may be obtained by reversing the above described paths. It will further be appreciated that the particular routes, and combinations of routes, described in this paragraph are merely exemplary, and any of the available routes and combinations thereof may be used, so long as data to be transmitted over the ground-air interface 6 in encrypted form is routed along black CMS-transceiver links 131-133 and 171-173.

In this embodiment, some commands emanating from a red area of the system are used to command communication resources in a black area. In other words, for example, some of the data that is passed over the ground-air interface 6 from the ground-based system 2 to the air-based system 4 may comprise a command (or request) from one of the ground AS/CRs 11-15 for one or more of the air wireless transceivers 81-83, and/or air voice radio channel resources 54 and 55, to implement, when that or those air wireless transceivers 81-83 is handling data that has been sent, or is being sent, or will be sent, to it over the ground-air interface 6 in encrypted form. For example, the third ground AS/CR 13 (i.e. the ground controller for the ground CMS 8) may be used to generate a command to change a parameter in the third air wireless transceiver 83. This command is passed from the third ground AS/CR 13 to the ground CMS 8 over the third ground AS/CR-CMS link 23, then passed over the first black link 131 (via the first encryption and decryption module 231 which produces an encrypted command comprising message) to the first ground wireless transceiver 41. The message is transmitted to the first air wireless transceiver 81 over the first wireless link 91, then routed over the first air black link 171 (via the first air encryption and decryption module 271, where the message containing the command is decrypted) to the air CMS 9. The air CMS 9 and/or air the air CMS controller 53 are used to pass the now unencrypted command to the third air wireless transceiver 83 over the third air red link 73.

In this embodiment, the ground CMS 8 and the air CMS 9 manage all of the unencrypted/encrypted (i.e. red/black) separation, i.e. in this embodiment no such separation is required to be carried out by any of the AS/CRs 11-15, 51-52.

The ground CMS 8 and the air CMS 9 are pre-programmed, or adaptively programmed, using for example the ground CMS controller 13, to configure the choice of CMS-transceiver links. This can accommodate flexibly, i.e. the ground CMS 8 and air CMS 9 can be programmed to connect any ground AS/CR 11-15 to any air AS/CR 51-55 via any paired set of CMS-transceiver links. Such flexibility can be used to provide desired levels of adaptability, content-dependent or situation-dependent alteration, and so on.

For example, relatively complex arrangements may be implemented. For example, one or more specific types of data may be routed over more than one paired set of CMS-transceiver links thereby providing redundancy. In addition to this, or independent of this, any received data may be routed by the receiving CMS to more than one AS/CR in its system e.g. the air CMS 9 may route received data to more than one air AS/CR 51-55.

Another example is that different levels or other differences in type of encryption may be applied to different types of data and/or different data routes by virtue of the different encryption and decryption modules handling differing encryption levels.

Another advantage of the above described flexibility is that the programmed nature of the data routes means that different data routes can be reconfigured at any time, for example by an operator at the ground CMS controller 13.

Another advantage is that the capability for route combinations to be pre-programmed allows a level of autonomy. For example, mode changes can be implemented in the air wireless transceivers 81-83 based on knowledge of the UAV position from, for example, one or more of the air AS/CRs 51-53.

Another advantage is that changing conditions can readily be accommodated, for example smooth degradation of communications can be provided where beneficial or for failure cases. For example, in a condition where a link such as 91 has been lost, the CMS 9 can attempt to reconnect with the ground CMS 8 based on a set of pre-programmed options, for example, by attempting to create a reversionary connection to the ground CMS 8 using, for example, the third wireless link 93.

None of the above described flexibility, and the accordant ease by which such flexibility is implemented, is provided in conventional arrangements for communicating with a UAV.

In the above, the routing mechanism itself may be implemented and maintained within the above described constraints by use of any appropriate routing mechanisms or protocols. However, one particularly advantageous way in which the above described constraints of routing may be implemented will now be described with reference to FIG. 2.

Figure 2:
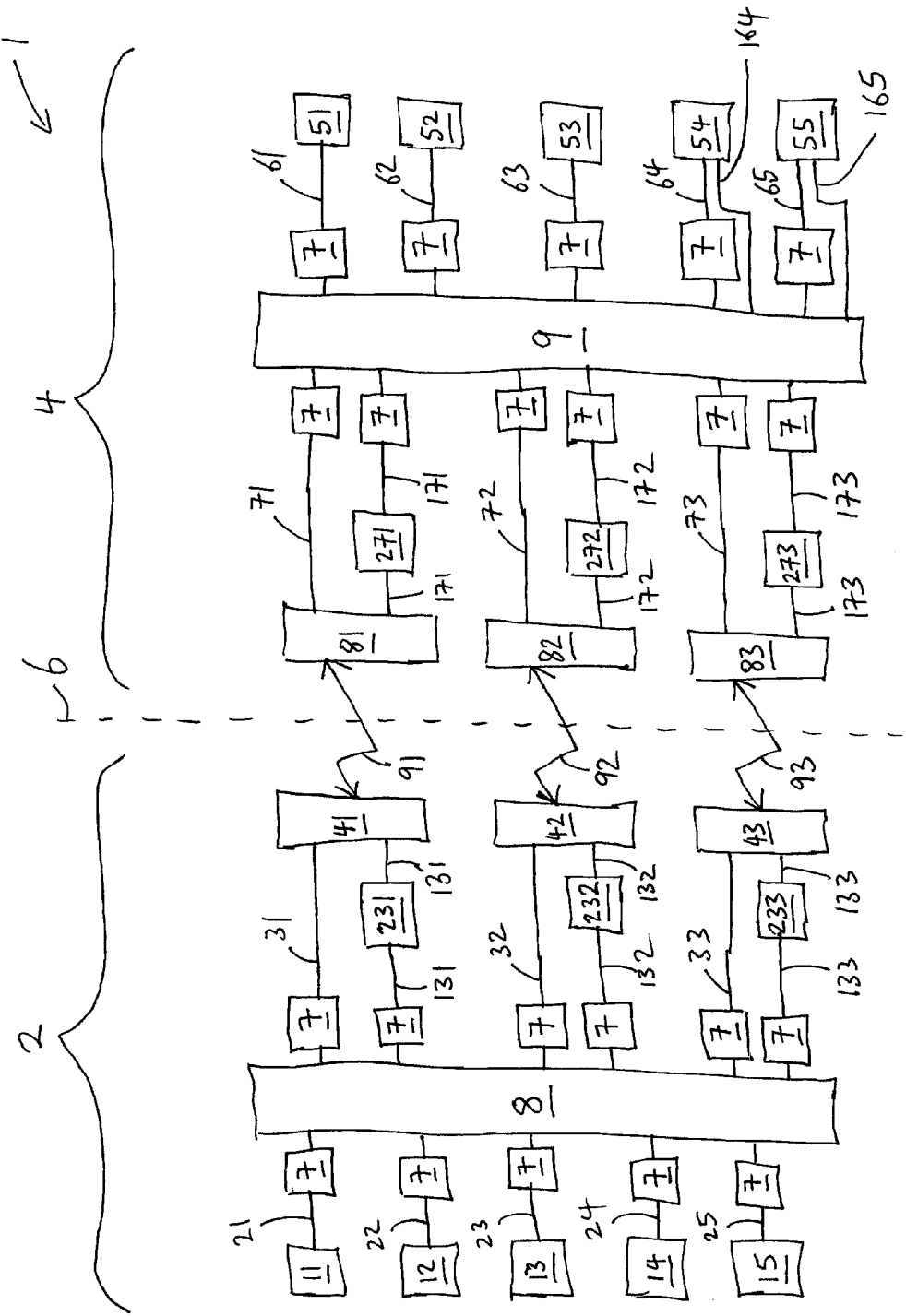
FIG. 2 is a schematic block diagram of a further embodiment of a communications management system 1 for a UAV.

FIG. 2 is a schematic block diagram of a further embodiment of a communications system 1 for UAV communications. In this embodiment, the communications system 1 is the same as, and operates the same as, the communications system 1 of FIG. 1, except where stated otherwise below. Also, the same elements are assigned the same reference numerals.

In the embodiment shown in FIG. 2, additional routing assurance is provided by a plurality of network interfaces 7. The network interfaces 7 may be viewed as gateway guardians. For each of the earlier described links entering and exiting the CMSs 8 and 9 (i.e. the ground AS/CR-CMS links 21-25, the ground CMS-transceiver links 31-33 and 131-133, the air AS/CR-CMS links 61-65 and 164-165, and the air CMS-transceiver links 71-73 and 171-173), a respective boundary network interface 7 is positioned between the CMS and the link. Accordingly, any data being passed to the CMS along the link is processed by the network interface 7 before it enters the CMS. In this direction, the network interface 7 operates to contribute to assuring that the data will be routed correctly by the CMS. Correspondingly, any data exiting the CMS is processed by the network interface 7 before it is passed over the link. In this direction, the network interface 7 operates to contribute to assuring that the data is not allowed to flow down a link that it is not meant to. This provides particularly advantageous assurance in relation to the communications system 1 where the route taken by data will be determined as a result of operator commands.

In the system of FIG. 2, the network interfaces 7 and their operation may be implemented by use of any appropriate technique. However, one particularly advantageous way in which the above described constraints of routing may be implemented will now be described. When data is being passed to the CMS along the link, the network interface 7 puts a new wrapper on the data packet, i.e. adds and/or amends and/or replaces a header or headers and/or a footer or footers of the data packet. The wrapper provides routing information for the CMS to act upon. When data is exiting the CMS, the network interface 7 verifies, by analysing the wrapper, that the data packet is one that is indeed meant to be passed along the link that the network interface 7 is in effect guarding.

It will be appreciated that in the above described embodiments, other elements, in addition to those described above, may be present in one or more of the various AS/CR-CMS links and/or CMS-transceiver links. Such additional elements may comprise network switches and the like.

It will also be appreciated that in the above described embodiments, additional data routes to those described above may be provided within the ground-based system 2 and/or within the air-based system 4. These data routes may include encryption and/or decryption functionality in addition to that described above. For example, within the air-based system 4, VUHF radio content may be encrypted, and passed between the air CMS and the air wireless transceivers along data routes independent of and/or in addition to the CMS-wireless transceiver links described above, and consequently over the ground-air interface 6.

In the above embodiments the CMSs 8, 9 are coupled to controllers 13, 53. However, this need not be the case, and in other embodiments other control or processor arrangements are provided for the CMSs 8, 9.

In the above embodiments, three wireless links are provided. However, it will be appreciated that this need not be the case, and in other embodiments other numbers of wireless links greater or less than three may be provided. Indeed, in simple embodiments, there may be only one wireless link provided.

In the above embodiments, each of the transceivers was provided with one red link and one black link to the CMS. However, this need not be the case, and in other embodiments one or more transceivers may be provided with a different arrangement of links to the CMS. For example, a transceiver may be provided with plural red links and/or plural black links to the CMS. Moreover, in other embodiments, for a single or plural red links provided between one or more of the transceivers and the CMS, there may be only red links, i.e. no black link. The reverse is also the case, i.e. in those embodiments or in yet further embodiments, for a single or plural black links provided between one or more of the transceivers and the CMS, there may be only those black links, i.e. no red link. Any combinations of such arrangements are possible.

In the above embodiments, none of the red links in either the ground-based system 2 or air-based system 4 are used to convey data to their respective transceivers for the purpose of the transceiver transmitting that data over the ground-air interface 6. However, this need not be the case, and in other embodiments, one or more of the red links may be used to convey data to its wireless transceiver for that data to be transmitted by the wireless transceiver, for example to transmit black data, i.e. already-encrypted data or data that is not required to be encrypted.

In the above described embodiments the communication system 1 is for communication between "ground" (more particularly a UAV control station) and "air" (more particularly a UAV being primarily controlled by the UAV control station). Accordingly in the above described embodiments the communications system 1 comprises a ground-based system 2 (located in the UAV control station) and an air-based system 4 located in the UAV. However, this need not be the case. For example, in other ground-air embodiments, the ground-based entity need not be a UAV control station as such. Also, for example, when the ground-based entity is a UAV control station, the UAV need not be a UAV that is being primarily controlled by that control station. Further for example, in other embodiments the communication system may be provided for communication between a UAV and another air-based entity, for example another UAV or a manned aircraft. In yet further embodiments, an extended form of the communication system may be provided for plural UAVs and/or plural other entities, for example a single UAV communicating with plural other entities such as ground-based entities and/or manned aircraft, and/or plural UAVs communicating with a single other entity, and/or plural UAVs communicating with plural other entities such as ground-based entities and/or manned aircraft.

Yet further embodiments may be provided by adding, to any of the above described embodiments or described variations thereof, further functionality as follows. In these yet further embodiments, One or both of the CMSs 8 and 9 are provided with functionality for mitigating (at least to an extent) what is known as line of sight voice "step-on". This is where the latency associated with the relay of voice traffic over a beyond line of sight network causes local synchronisation issues. For example, voice traffic fed to the ground CMS 8 from the ground AS/CR 14 that is required to be transmitted over the ground-air interface 6 in encrypted form from the ground-based system 2 to the air-based system 4 may be routed by the ground CMS 8 (and other conventional routing elements such as a network switch (not shown) of the ground-based system 2) along the first black ground CMS-transceiver link 131 (where the data is encrypted by the first ground encryption and decryption module 231) to the first ground transceiver 41, where the encrypted data is transmitted over the first wireless link 91. The encrypted data is accordingly received by the first air transceiver 81 and routed (including where relevant by other conventional routing elements such as a network switch (not shown) of the air-based system 4) along the first black air CMS-transceiver link 171 (where the data is decrypted by the first air encryption and decryption module 271) to the air CMS 9 from where the data is routed to the appropriate air AS/CR such as 54. It may be that by this point, the latency associated with transporting that voice data to AS/CR 54 could be in the order of seconds and another local asset may already be transmitting on the channel that AS/CR 54 is tuned to. AS/CR 54 will not know this, and will attempt to transmit the voice data as soon as it is received, causing what is known as "step-on" of the other transmission, meaning that neither the UAV nor the other local assets' transmissions are successfully made. Thus, in these yet further embodiments, the air CMS 9 is arranged to monitor the status of the air voice radio channel resources (in this example AS/CR 54), whilst buffering the digitised voice data until such a time as the channel is seen to be clear of other transmissions. At this point, the digitised voice will be passed to the air voice radio channel resource for transmission off the UAV. Thus mitigation (at least to an extent) of the possible line of sight voice "step-on" is provided. More generally, it is the case that the CMS may be arranged to selectively buffer data that has been received with a delay if in consequence of the delay an intended recipient AS/CR of the UAV is not in a desired operating condition (i.e. although in the specific example given earlier in this paragraph the undesired operating condition due to the delay is that the intended recipient AS/CR is handling other data, this is not the only possible example, and in other embodiments appropriate buffering may be implemented to alleviate the effects of any other operating condition of the AS/CR that is no longer as desired as a consequence of the delay).

As stated, the various overall communications systems 1 as described above with reference to FIGS. 1 and 2, and the other variations thereof described above, represent embodiments of the invention. However, it will be appreciated that many individual portions of those overall systems (with the relevant variations as mentioned above) in themselves represent embodiments of the invention in their own right. For example, each of the following (with the relevant variations as mentioned above) represent embodiments in their own right (note this list is not exhaustive):

the air-based system 4;
the air CMS 9 in combination with relevant controller such as CMS controller 53;
the air CMS 9;
a UAV comprising any of the three possibilities listed in the preceding bullet points;
the ground-based system 2;
the ground CMS 8 in combination with relevant controller such as CMS controller 13; and
the ground CMS 8.

For the avoidance of doubt, it is noted that unless stated otherwise, or unless impossible in the context, the use of the word "between" in phrases such as "between A and B", when used in the sense of e.g. data being communicated between A and B, is used herein to encompass all of the following, at least as possibilities: "from A to B"; "from B to A"; and "from A to B and from B to A".

Apparatus for implementing the above described elements, modules, arrangements, systems, functionality, methods and modes of operation may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The invention claimed is:

1. A communications management system for an unmanned air vehicle; wherein the communications management system is adapted for use on an unmanned air vehicle, and selectively routes data between a plurality of avionic subsystems and/or communications resources on the unmanned air vehicle and a plurality of transceivers on the unmanned air vehicle, the routes selected being determined at least in part according to a desired red and black data separation of data to be transmitted from the transceivers and/or a red and black data separation of data being received by the transceivers, the communications management system comprising:

a configurable router for use on the unmanned air vehicle, the router routing data between the plurality of avionic subsystems and/or communications resources on the unmanned air vehicle and the plurality of transceivers on the unmanned air vehicle.

2. A communications management system according to claim 1, further comprising a controller for the configurable router, the controller being adapted for use on the unmanned air vehicle.

3. A communications management system according to claim 1, wherein for at least one of the transceivers on the unmanned air vehicle, the communications management system further comprises at least one black link linking the router to the transceiver.

4. A communications management system according to claim 3, wherein for a plurality of the transceivers on the unmanned air vehicle, the communications management system further comprises at least one respective black link linking the router to the respective transceiver.

5. A communications management system according to claim 1, wherein for at least one of the transceivers, the communications management system further comprises at least one red link linking the router to the transceiver.

6. A communications management system according to claim 1, wherein the communications management system further comprises separate red links and/or black links between the router and the respective avionic subsystem and/or communications resource of the plurality of avionic subsystems/communications resources.

7. A communications management system according to claim 1, wherein the communications management system further comprises a respective gateway guardian at an interface between the router and at least one of the following: a black router-transceiver link(s), a red router-transceiver link(s), and the router-avionic subsystem and/or communications resource link(s).

8. A communications management system according to claim 1, wherein the communications management system selectively buffers data that has been received with a delay if in consequence of the delay an intended recipient avionic subsystem and/or communications resource of the unmanned air vehicle is not in a desired operating condition.

9. A communications management system for managing communication between an unmanned air vehicle and a separate entity, comprising: a communications management system for the unmanned air vehicle according to claim 1; and a communications management system for the separate entity; the communications management system for the separate entity being arranged to selectively route data between a plurality of avionic subsystems and/or communications resources of the separate entity and a plurality of transceivers of the separate entity, the routes selected being determined at least in part according to a desired red and black data separation of data to be transmitted from the transceivers of the separate entity and/or a red and black data separation of data being received by the transceivers of the separate entity.

10. A communications management system for managing communication between an unmanned air vehicle and a separate entity, comprising: a communications management system for the unmanned air vehicle according to claim 1; and a communications management system for the separate entity;
the communications management system for the separate entity being arranged to selectively route data between a plurality of avionic subsystems and/or communications resources of the separate entity and a plurality of transceivers of the separate entity, the routes selected being determined at least in part according to a desired red and black data separation of data to be transmitted from the transceivers of the separate entity and/or a red and black data separation of data being received by the transceivers of the separate entity;
wherein the communications management system for the separate entity comprises one or more features corresponding to the elements recited for the communications management system for the unmanned air vehicle.

11. An unmanned air vehicle, comprising: a communications management system according to claim 1; a plurality of transceivers; and a plurality of avionic subsystems and/or communications resources.

12. A method of managing communications on an unmanned air vehicle, the method comprising:
providing a configurable router for use on the unmanned air vehicle, the router routing data between the plurality of avionic subsystems/communications resources on the unmanned air vehicle and the plurality of transceivers on the unmanned air vehicle; and
selectively routing data between a plurality of avionic subsystems and/or communications resources on the unmanned air vehicle and a plurality of transceivers on the unmanned air vehicle, the routes selected being determined at least in part according to a desired red and black data separation of data to be transmitted from the transceivers and/or a red and black data separation of data being received by the transceivers.

13. A non-transitory computer readable medium having a computer program product for execution by a computer system or one or more processors to cause the computer system or the one or more processors to operate in accordance with the method of claim 12.

14. A non-transitory computer readable storage medium for storing a program or at least one of the plurality of programs according to claim 13.

* * * * *